United States Patent [19]

Jonassen

[11] 3,890,543

[45] June 17, 1975

[54] LOW VOLTAGE SURGE PROTECTION NETWORK

[75] Inventor: Gaylord D. Jonassen, Smithtown, N.Y.

[73] Assignee: Telecommunications Industries, Inc., Copaigue, N.Y.

[22] Filed: Sept. 14, 1973

[21] Appl. No.: 397,258

[52] U.S. Cl. .................. 317/16; 179/184; 317/61.5

[51] Int. Cl. ........................................ H02h 3/22

[58] Field of Search ................ 317/16, 31, 61, 61.5; 179/184

[56] References Cited

UNITED STATES PATENTS

| | | | |
|---|---|---|---|
| 2,789,254 | 4/1957 | Bodle et al. | 317/61 |
| 3,181,033 | 4/1965 | Bakker | 317/61 |
| 3,527,985 | 9/1970 | Brown | 317/16 |
| 3,644,787 | 2/1972 | Hamilton | 317/16 |

*Primary Examiner*—James D. Trammell

*Attorney, Agent, or Firm*—Allen R. Morganstern

[57] ABSTRACT

A low Voltage Surge Protection Network comprising a multi-electrode gas tube arrester having an optional integral temperature sensitive lift-off capability wherein the multi-electrode gas tube arrester has directly coupled across it, back-to-back zenier diodes, such that voltage imbalance conditions induced across a line pair are corrected within a time interval sufficient to prevent damage to low voltage operating equipment electrically coupled across said line pair.

10 Claims, 5 Drawing Figures

PATENTED JUN 17 1975

3,890,543

LOW VOLTAGE SURGE PROTECTION NETWORK

BACKGROUND AND OBJECTS OF THE INVENTION

The present invention relates generally to protection networks, and in particular, to low voltage protection networks capable of protecting integrated circuitry, semiconductor networks, sensitive solid state components and the like, as well as any other form of electrical apparatus that is unable to withstand any appreciable line imbalance or voltage differential across its terminals.

Prior to the present invention, when a line imbalance or voltage differential occurred across a line pair, reliance was placed upon a variety of voltage triggered arresters and arrester networks whose operative principles are such that upon the reaching of a predetermined voltage level differential across a pair of lines, a heretofore open circuit shunting path would become operative permitting a short circuit path to develop across said lines, or in the alternative, provide a short circuit path to ground.

Although the prior art arresters and arrester networks heretofore utilized by the industry are satisfactory under certain operative conditions, they, in and of themselves, do not provide sufficient protection for the advanced integrated circuitry of today, given a line imbalance or a voltage differential condition. On the contrary, during the period of up to the 1 μsec interval after the occurrence of a voltage differential condition, which is a critical time interval for the protection of the advanced integrated circuitry of today, the prior art arresters and arrester networks utilized by the industry today are useless, since most of them have a delay time characteristic of at least 1 μsec.

It is therefore an object of this invention to create a new and improved low voltage surge protection network that limits line differential almost instantaneously, thereby providing protection for the advanced integrated circuitry of today.

It is another object of this invention to create a new and improved low voltage surge protection network that incorporates a lift-off capability into its design such that for sustained overload conditions, the network will lift itself off of the line so as to avoid becoming a fire hazard and additionally take with it the electrical apparatus whose protection is sought.

It is another object of this invention to create a new and improved low voltage surge protection network that is compact in design, rugged in construction, and economical to manufacture.

It is another object of this invention to create a new and improved low voltage surge protection network that does not require current limiting resistors coupled within the network between the gas tube arrester and the back-to-back zenier diode configuration although it is within the scope of this invention to so utilize them.

The objects and advantages of the invention are set forth in part herein and in part will be obvious herefrom, or may be learned by practice of the invention, the same being realized and attained by means of the instrumentalities and combinations pointed out in the appended claims.

The invention consists in the novel parts, construction, arrangements, combinations and improvements herein shown and described.

SUMMARY OF THE INVENTION

Briefly described, the present invention is directed to a novel and improved low voltage surge protection network capable of providing protection for any form of electrical apparatus, be it integrated circuitry, semiconductor networks, sensitive solid state components, and the like, or any other form of electrical apparatus that is unable to withstand any appreciable line imbalance or voltage differential across its terminals. As herein preferably embodied, the low voltage surge protection network comprises a three electrode gas discharge tube arrester having coupled directly across its end electrodes, a pair of oppositely poled, semiconductor switching devices, be they zener diodes of the like, coupled in back-to-back configuration, the entire network then being coupled across a line pair between the electrical apparatus that is to be protected and its source of energy. Although a three electrode gas discharge tube arrester is illustrated herein, nothing herein should be interpreted so as to so limit the invention, as its applicability is to gas tube arresters of a multi-electrode design.

In keeping with the invention, upon there occurring a voltage imbalance across a line pair above the triggering voltage level of the zener diodes, an almost instantaneous short circuit path across the line pair via said diode configuration is created, thereby providing an almost instantaneous shunting path that bypasses and thus protects the electrical apparatus from said line imbalance. Should the imbalance continue and be of a magnitude that would cause the destruction of said diode configuration, then, according to design criteria, and in accordance with the invention, the gas tube arrester will trigger thereby sustaining the burden of shunting thus avoiding the destruction of the zener diode configuration. In so doing, as herein stated, the gas tube arrester provides a short circuit path across the line pair which is additionally coupled to ground and which is separate and distinct from said diode path. Due to its impedance characteristics and coupling to ground, said gas tube arrester path, once triggered, assumes the shunting function of the diode configuration thereby causing said configuration to be rendered passive and thus eliminating the possibility of having the diode configuration burn out due to an imbalance condition that is of a magnitude and that exists for a time interval which would be destructive of said configuration if borne by said configuration for said full time interval. In this manner, the zener diode configuration coupled across the gas tube arrester in combination with the three electrode gas tube arrester provides an effective low voltage protection network that is almost instantaneous in its triggering.

As an additional feature, and in accordance with the present invention, the network incorporates a lift-off capability as disclosed in my U.S. Patent, filed on Dec. 8, 1972 and issued on Dec. 11, 1973, bearing U.S. Pat. No. 3,778,679, entitled Temperature Sensitive Electrical Regulating Device wherein upon a condition of sustained line imbalance, the gas tube arrester, upon reaching a predetermined temperature level, will be lifted off of the line pair, thereby avoiding a fire hazard condition.

It should be understood that the foregoing general description and the following detailed description as well are exemplary and explanatory of the invention, but are not restrictive thereof.

The accompanying drawings, referred to herein and constituting a part hereof, are illustrative of the invention but not restrictive thereof, and together with the description and the accompanying claims, serve to explain the principles of the invention.

DESCRIPTION OF A PREFERRED EMBODIMENT

Figures 1, 2, 3, 4, 5:
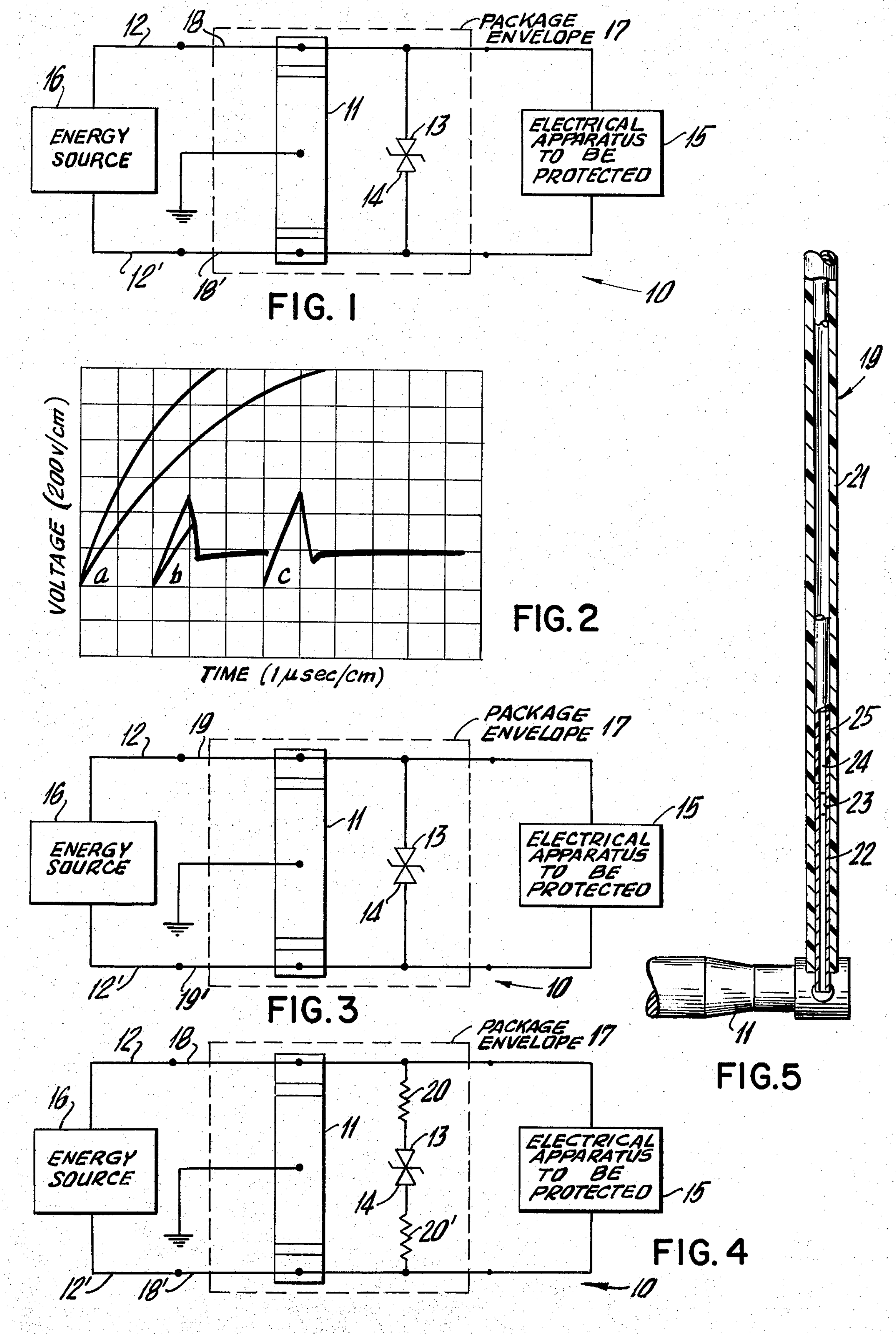
FIG. 1 is an electrical schematic of the low voltage surge protection network, constructed in accordance with the invention and coupled across a line pair in an illustrative electrical environment.
FIG. 2 is a graphical representation of a comparative nature illustrating voltage vs. time plots under three separate conditions; to wit, graphical representation *a* representing an unprotected line pair during an imbalance condition; graphical representation *b* representing a line pair during an imbalance condition which is protected by a prior art protection network; and graphical representation *c* representing a line pair during an imbalance condition which is protected by a low voltage surge protection network constructed in accordance with the invention.
FIG. 3 is an electrical schematic illustrating the low voltage surge protection network constructed in accordance with the invention and illustrative of the lift-off capability.
FIG. 4 is an electrical schematic illustrating the low voltage surge protection network constructed in accordance with the invention wherein current limiting resistors are in series coupling with the back-to-back zener diode configuration of the network.
FIG. 5 is a cross sectional view of a portion of the electrically conductive coupling element 19 or (19') incorporating one illustrative embodiment of the lift-off capability of said low voltage surge protection network.

Referring now more particularly to the invention as depicted in the accompanying drawings, there is illustrated in FIG. 1 a low voltage protection network, indicated generally by reference numeral 10, said low voltage protection network being coupled via coupling elements 18 and 18' to a generalized electrical environment consisting of an energy source 16, electrical apparatus 15 and line pair 12–12'.

In accordance with the invention, low voltage protection network 10 is coupled between energy source 16 and electrical apparatus 15 and comprises a multi-electrode gas tube arrester 11 being electrically coupled across line pair 12–12' with the middle electrode of gas tube arrester 11 being coupled directly to ground. Zener diodes 13 and 14 are coupled directly across gas tube arrester 11 in back-to-back configuration without requiring current limiting protective resistors between each Zener diode and the electrode to which it is coupled. By interrelating the threshold level of actuation of gas tube arrester 11, with the operative characteristics of Zener diodes 13 and 14, the need for current limiting resistors in the coupling between each Zener diode and its respective electrode is eliminated since the Zener diodes are of a design so as to be able to sustain the anticipated voltage differential during the time interval prior to the triggering of three electrode gas tube arrester 11. Although the embodiment of the invention illustrated in FIG. 1 depicts a network free of current limiting resistors in the coupling between each Zener diode and its respective electrode, it is within the scope of this invention, as an alternative embodiment, to have coupled between said diodes and their respective electrodes as added protection, current limiting impedances 20 and 20' (see FIG. 4). In addition, in its broadest scope, the current invention is not limited to the utilization of zener diodes across said gas tube arrester 11, but rather, it is within the scope of this invention to utilize therein a pair of semiconductor switching devices electrically coupled in an oppositely poled configuration so as to provide a regulated shunting path independent of the polarity of any line imbalance. A packaging envelope 17, consisting of insulative material, encapsulates gas tube arrester 11 and zener diodes 13 and 14 so as to provide a compact, rugged and easily handleable package.

To better understand the operation of the invention the problems for which the invention is designed to overcome should first be defined and understood. In particular, with the development of solid state components, semiconductor networks, integrated circuits, and the like, said electrical apparatus have minute time responses and are operative under low voltage conditions. Thus, a large line imbalance appearing across said electrical apparatus for a small time duration, which would be acceptable to heretofore devised electrical apparatus, would be of a destructive nature to the solid state components, semiconductor networks and integrated circuitry of today. Whereas the prior art protective networks available to the industry prior to this invention were adequate for the components and circuitry of their day, said prior art devices do not respond to a line imbalance in sufficient time to protect the components and circuitry of today.

Reference is now made to FIG. 2 as illustrative of the above. In FIG. 2, there is illustrated on the same voltage vs. time axis, three separate voltage vs. time plots. In the first plot, designated *a*, there is illustrated a voltage vs. time plot of the voltages appearing on a line pair during an imbalance condition wherein no protection network appears across the line pair. As a result, the voltage imbalance appearing across said line pair goes unchecked and would undoubtedly cause damage to almost any electrical apparatus electrically coupled across said line pair.

In the second plot, designated *b* of FIG. 2, there is illustrated a voltage vs. time plot of the voltages appearing on a line pair during an imbalance condition wherein a prior art protection network is coupled across said line pair. As can be readily seen, a line imbalance exists for approximately 1 μsec, whereupon, after a sufficient voltage imbalance occurs and a sufficient time interval passes so as to trigger said prior art protection network, stabilization of the imbalance condition occurs, but only after the passing of approximately a 1 μsec interval.

The obvious drawback to the prior art protection networks is evident upon review of FIG. 2b wherein it is readily seen that the line imbalance continues for approximately said 1 μsec interval. Although some electrical apparatus is capable of withstanding such a line imbalance condition for such a time interval, the advanced circuitry of today does not fall within said category.

In the third plot, designated *c* of FIG. 2 there is illustrated a voltage vs. time plot of the voltages appearing on a line pair during an imbalance condition wherein a low voltage surge protection network constructed in accordance with the invention is coupled across said line pair. As can readily be seen, the voltage vs. time plot indicates a virtual instantaneous coupling of the two lines without any appreciable voltage differential appearing across the lines, thus providing protection from a line imbalance condition for the advanced circuitry of today.

In actual operation and in accordance with the invention, low voltage surge protection network 10 is inoperative during normal operating conditions, and energy source 16 is permitted to supply energy to electrical apparatus 15 via line pair 12–12'. The back-to-back zener diode configuration consisting of zener diodes 13 and 14, and as illustrated in FIG. 1, can have any one of a variety of operating characteristics, exemplary thereof being zener diodes 13 and 14 having threshold voltages of 5 volts each. Thus, upon there occurring a line imbalance across lines 12–12' of a value in excess of 5 volts, the back-to-back zener diode configuration consisting of zener diodes 13 and 14 is rendered conductive and a conductive path across line pair 12–12' via said zener diode configuration shunts the flow of current across any electrical apparatus 15 coupled across said line pair. Since said back-to-back zener diode configuration is virtually instantaneous in its turning on once the diode's threshold level is reached, the time delay characteristic of the prior art devices, as discussed above with reference to FIG. 2 *b*, is eliminated (see FIG. 2 *c*).

Even though the back-to-back diode configuration consisting of zener diodes 13 and 14 is virtually instantaneous in its turning on once the threshold voltage is reached and is capable of providing a shunting path for imbalance conditions below a certain level, said configuration cannot operate under a sustain and continuous over voltage imbalance condition when said voltage imbalance levels are excessive without destroying itself. It is therefore, in keeping with the invention, the purpose of three electrode gas tube arrester 11 to carry the burden of shunting across said line pair for the major portion of any excessive line imbalance condition. By coordinating the delay time characteristics for the firing of gas tube arrester 11 with the operative characteristics of zener diodes 13 and 14, gas tube arrester 11, for an excessive line imbalance condition, in effect, lifts the zener diode configuration off of the line prior to its destruction due to the carrying of excessive current levels resulting from excessive and prolonged line imbalance. By firing at the appropriate time and providing a path to ground, gas tube arrester 11 provides first, an additional shunting path whose impedance is less than that of the diode configuration path, said new path being across diodes 13 and 14 as well as the electrical apparatus that is to be protected, and second, provides a protective means for the zener diode configuration as well as the electrical apparatus to be protected by providing a low impedance path to ground that can effectively ground all current and thus provide grounding protection for not only said electrical apparatus 15, but also the diode configuration consisting of said diodes 13 and 14.

As a result of this unique configuration, the occurrence of a line imbalance condition will not result in the distruction of any electrical apparatus coupled across said line pair; said electrical apparatus will be protected virtually instantaneously as of the occurrence of said line imbalance; and a path to ground, which bypasses the electrical apparatus that is to be protected, is created, said path acting as a means for dissipating the line imbalance condition as well as acting as a means to effectively render passive, prior to its destruction, the diode configuration that is responsible for the instantaneous reaction to said line imbalance.

In accordance with the invention, reference is now made to FIG. 3, wherein there is illustrated an alternative embodiment of the invention, incorporating a temperature sensitive lift-off capability heretofore disclosed in my U.S. Patent, filed on Dec. 8, 1972 and issued on Dec. 11, 1973, bearing U.S. Pat. No. 3,778,679, entitled Temperature Sensitive Electrical Regulating Device.

To avoid having the low voltage surge protection network become a fire hazard during a sustained imbalance condition, which could additionally result in having the electrical apparatus, whose protection is sought, then bear the full imbalance across its terminals, a temperature sensitive lift-off capability is incorporated into the present invention which, when activated, not only lifts off low voltage surge protection network 10 from the line, but additionally takes with it electrical apparatus 15.

Basically, the temperature sensitive lift-off capability referred to above is achieved by utilizing coupling elements 19 and 19' for electrically coupling envelope package 17 between energy source 16 and electrical apparatus 15, said elements having a portion thereof consist of an electrically insulative outer covering that encapsulates an inner core of electrically conductive material. The outer covering is designed to provide structural integrity as well as insulative and aesthetic properties. The inner core of electrically conductive material comprises a fusable electrically conductive lining which, upon reaching a predetermined temperature level, corresponding to a fire hazard condition, melts, thereby causing a break in the electrical conductivity of said coupling element, resulting in there occurring an open circuit such that the entire surge protection network, and the electrical apparatus whose protection is sought, cease to be coupled across the source of energy.

As illustrated in FIG. 3, package envelope 17 is identical to package envelope 17 of FIG. 1, containing therein as illustrated in FIG. 1, three electrode gas tube arrester 11 having coupled across it the back-to-back Zener diode configuration consisting of Zener diodes 13 and 14. Coupling elements 19 and 19' provide the electrical coupling means for coupling low voltage surge protection network 10 and electrical apparatus 15 across line pair 12 – 12'.

In accordance with the invention, as illustrated in FIG. 3, wherein there is illustrated an alternative embodiment of the invention which incorporates a thermal responsing lift-off capability, reference is now made to FIG. 5 wherein there is illustrated a partial cross-sectional view of coupling elements 19 and 19' illustrating one embodiment of the lift-off capability as referred to above.

As depicted in FIG. 5, electrically conductive coupling element 19 (or 19') comprises an electrically insulative outer wall member 21 that is cylindrical in shape and defines an inner cavity running the entire length of its structure. As further depicted in FIG. 5, electrically conductive coupling element 19 (or 19') has contained within the cavity defined by electrically insulative outer wall member 21, an electrically conductive lining 22 of hollow configuration that occupies a portion of said defined cavity wherein one end of said electrically conductive lining 22 is electrically coupled to an electrode of said gas tube arrester 11 and the other end of said electrically conductive lining 22 is electrically coupled via solder connection 23 to a solid core of electrically conductive wire 24 having its own electrically insulative covering 25, said solid core of electrically conductive wire 24 occupying the remainder of the defined cavity of electrically conductive coupling element 19 (or 19'). Electrically conductive wire 24 has its free end, namely, that end which is not electrically coupled to fusable electrically conductive lining 22, electrically coupled to line 12 (or 12'). In operation, upon having electrically conductive coupling element 19 (or 19') reach a predetermined temperature level representative of a fire hazard, electrically conductive hollow lining 22 will change into a liquid thereby flowing into the cavity defined by the heretofore rigid hollow structure of said electrically conductive lining thus causing a break in the electrical conductivity of said hollow lining structure thereby disconnecting low voltage surge protection network 10 and electrical apparatus 15 from energy source 16.

It should be pointed out that although electrically conductive coupling element 19 (or 19'), as illustrated in FIG. 5, and as hereinafter discussed, has a portion of it consist of an electrically conductive wire while the remaining portion of said electrically conductive coupling element consists of an electrically conductive lining having a hollow configuration, nothing herein should be interpreted so as to restrict the invention to only such an embodiment. On the contrary, it should be understood that the present invention has wide applicability to a variety of embodiments other than the embodiment specifically illustrated in FIG. 5 and that the present invention in its broadest scope with respect to its lift-off capability is applicable to any embodiment wherein coupling element 19 (or 19') upon reaching a predetermined temperature level, provides an open circuit between energy source 16 and low voltage protection network 10.

In keeping with the above, electrically conductive coupling element 19 (or 19') can have electrically conductive lining 22 of hollow configuration run the entire length of electrically conductive coupling element 19 (or 19') and totally eliminate the use of electrically conductive wire 24; or, their combined utilization as illustrated in FIG. 5 can be, with regard to their respective lengths, as compared to the overall length of electrically conductive coupling element 19 (or 19'), of any desire ratio. Additionally, it is within the scope of this invention to utilize as electrically conductive lining 22, a conductive lining that is not restrictive merely to the embodiment illustrated in FIG. 5. Although FIG. 5 illustrates a fusable electrically conductive lining 22 having a hollow configuration, it is within the scope of this invention to encompass, as stated above, all variations of design that effectuate a break in the electrical conductivity of said electrically conductive lining 22 upon having said lining reach a predetermined temperature, be said design take the form of a composition whose resistance versus temperature plot effectuates the equivalent of an open circuit once said composition reaches a particular temperature level, or, as another illustrative alternative, having said lining take the form of closely packed granules of electrically conductive material which, upon reaching a predetermined temperature level, will fuse into one solid mass which occupies only a portion of the volume heretofore occupied by the granules of electrically conductive material, thereby causing a break in the electrical conductivity of said granule structure.

In addition to the various forms which electrically conductive coupling element 19 (or 19') may take, it is also within the scope and intent of this invention to, by proper design, to selectively set the temperature at which electrically conductive coupling element 19 (or 19') will no longer electrically conduct. Such regulative capability can take the form of selectively combining the elements of composition that comprise electrically conductive lining 22 or its alternative equivalents such that a composition of matter is fabricated that has the predetermined desired melting point.

In keeping with the invention, it is within the scope thereof to utilize as an alternative embodiment of the temperature sensitive lift-off structure illustrated in FIG. 5, a design that provides for the utilization of electrically conductive hollow lining 22 coupled between the respective electrodes of gas tube arrester 11 and respective coupling terminals positioned on the exterior of package envelope 17 so as to facilitate the coupling of low voltage protection network 10 across energy source 16. Package envelope 17, as described above, contains gas tube arrester 11 and back-to-back zener diodes 13 and 14 coupled directly across the end terminals of gas tube arrester 11. In accordance with this alternative embodiment of the invention, package envelope 17 is filled with a thermal and electrical insulative material such that upon having low voltage protection network 10 reach the predetermined temperature level whereby said electrically conductive hollow lining 22 melts thereby breaking its electrical continuity and thus lifting low voltage protection network 10 and electrical apparatus 15 off of the line without having said network become a fire hazard, said thermal and electrical insulative material confines the flow of melted electrically conductive hollow lining 22 so as not to have melted electrically conductive hollow lining 22 become destructive or a fire hazard.

The preceding description and accompanying drawings relate primarily to the use of the invention as a low voltage surge protection network for utilization within an electrical environment for protection against line imbalance conditions. Although specific reference has been made to the utilization of the present invention within an electrical environment for protection in association with integrated circuitry, semiconductor networks, solid state components, and the like, it should be understood that the invention as herein described is not so limited, but is equally applicable for use as a means for protecting from damage due to an unexpected line imbalance condition, any item of electrical apparatus. Thus, the invention in its broader aspects is not limited to the specific embodiments herein shown and described, but departures may be made therefrom within the scope of the accompanying claims, without departing from the principles of the invention and without sacrificing its chief advantages.

I claim:

1. A low voltage surge protection network for protecting from a line imbalance electrical apparatus coupled across an energy source, said network comprising:

a. a pair of semiconductor switching devices electrically coupled in series, in an oppositely poled back-to-back configuration, said electrical characteristics providing for instantaneous triggering upon the occurrence of a line imbalance;

b. a multi-electrode gas tube arrester wherein one of said electrodes is electrically coupled to ground, said multi-electrode gas tube arrester being rendered conductive by a voltage level that is below that which would cause the destruction of said pair of Zener Diodes;

c. means for providing direct electrical coupling of said Zener Diode configuration across the ungrounded electrodes of said multi-electrode gas tube arrester;

d. means for electrically coupling said network across said source of energy and in shunting configuration with said electrical apparatus; and e. thermal responsive means for interrupting the flow of electrical energy to said network upon having said network reach a predetermined temperature level, wherein said means for interrupting the flow of electrical energy to said network comprises a hollow electrically conductive lining electrically coupled at one end to an ungrounded electrode of said multi-electrode gas tube arrester and the other end of said hollow electrically conductive lining being electrically coupled to said means for electrically coupling said network across said source of energy, said electrically conductive lining being encapsulated within a thermal and electrically insulative material.

2. A low voltage surge protection network as described in claim 1 wherein said pair of semiconductor switching devices comprise a pair of Zener Diodes.

3. A low voltage surge protection network as described in claim 2 wherein said pair of Zener Diodes have matched electrical characteristics.

4. A low voltage surge protection network as described in claim 1 wherein said multi-electrode gas tube arrester is of a three electrode design.

5. A low voltage surge protection network as described in claim 2 wherein current limiting impedance is in series coupling between each Zener Diode and the respective electrode of said multi-electrode gas tube arrester to which said Zener Diode is electrically coupled.

6. A low voltage surge protection network for protecting, from a line imbalance, electrical apparatus coupled across an energy source, said network comprising:

a. a first of two parallel electrical paths, said first electrical path comprising, in series relationship, a pair of semiconductor switching devices electrically coupled in an oppositely poled back-to-back configuration having electrical characteristics wherein an electrically conductive shunting path across said electrical apparatus is provided upon there occurring a voltage differential independent of polarity across said electrical apparatus;

b. a second of two parallel electrical paths, said second electrical path comprising a multi-electrode gas tube arrester having one of said electrodes coupled to ground, said multi-electrode gas tube arrester having electrical characteristics such that said multi-electrode gas tube arrester is rendered conductive upon there occurring a voltage differential across said electrical apparatus that is of a magnitude that would be destructive of said pair of Zener Diodes, said second electrical path, when said multi-electrode gas tube arrester is rendered conductive, providing an electrically conductive path whose impedance characteristics are less than the impedance characteristics of said first electrical path when said first electrical path is in a conductive state, as well as providing a conductive shunting path across said electrical apparatus and said first of two parallel electrical paths which also is coupled to ground;

c. means for electrically coupling said first parallel electrical path and the ungrounded electrodes of said multi-electrode gas tube arrester of said second parallel electrical path across said electrical apparatus; and d. thermal responsive means for interrupting the flow of electrical energy to said network upon having said network reach a predetermined temperature level, wherein said means for interrupting the flow of electrical energy to said network comprises a hollow electrically conductive lining electrically coupled at one end to an ungrounded electrode of said multi-electrode gas tube arrester and the other end of said hollow electrically conductive lining being electrically coupled to said means for electrically coupling said network across said source of energy, said electrically conductive lining being encapsulated within a thermal and electrically insulative material.

7. A low voltage surge protection network as described in claim 6 wherein said pair of semiconductor switching devices comprise a pair of Zener Diodes.

8. A low voltage surge protection network as described in claim 7 wherein said pair of Zener Diodes have matched electrical characteristics.

9. A low voltage surge protection network as described in claim 6 wherein said multi-electrode gas tube arrester is of a three electrode design.

10. A low voltage surge protection network as described in claim 7 wherein current limiting impedance is in series coupling between each Zener Diode and the respective electrode of said multi-electrode gas tube arrester to which said Zener Diode is electrically coupled.

* * * * *

UNITED STATES PATENT OFFICE
CERTIFICATE OF CORRECTION

Patent No. 3,890,543 Dated June 17, 1975

Inventor(s) Gaylord D. Jonassen

It is certified that error appears in the above-identified patent and that said Letters Patent are hereby corrected as shown below:

In the drawings Figure 4, should appear as shown below:

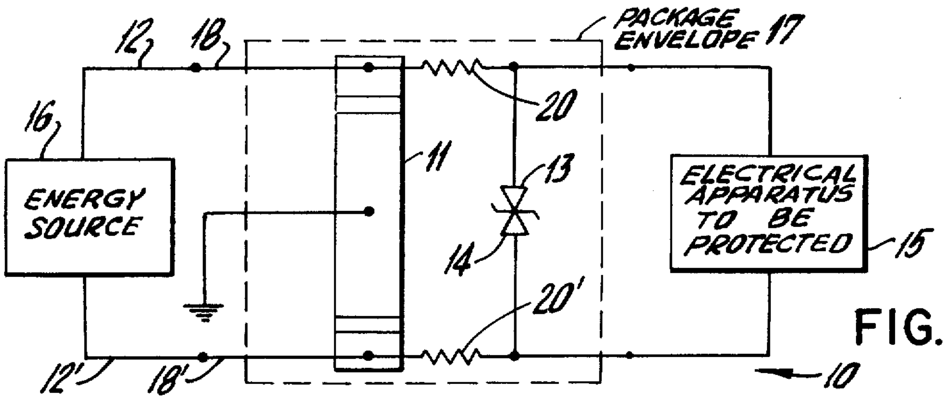

FIG. 4

Signed and Sealed this

Tenth Day of May 1977

[SEAL]

Attest:

RUTH C. MASON
*Attesting Officer*

C. MARSHALL DANN
*Commissioner of Patents and Trademarks*